(12) United States Patent
Dedieu et al.

(10) Patent No.: US 7,298,862 B2
(45) Date of Patent: Nov. 20, 2007

(54) ASYMMETRICAL LOUDSPEAKER ENCLOSURES WITH ENHANCED LOW FREQUENCY RESPONSE

(75) Inventors: Stephane Dedieu, Ottawa (CA); Philippe Moquin, Ottawa (CA); Anders Fahrendorff, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 447 days.

(21) Appl. No.: 10/669,138

(22) Filed: Sep. 22, 2003

(65) Prior Publication Data

US 2004/0131218 A1    Jul. 8, 2004

(30) Foreign Application Priority Data

Sep. 23, 2002    (GB) ................... 0222067.1

(51) Int. Cl.
*H04R 25/00*    (2006.01)
(52) U.S. Cl. .................. 381/386; 381/345; 381/182
(58) Field of Classification Search ........... 381/309, 381/71.1, 71.6, 71.7, 72, 345, 349, 370, 371, 381/372, 74, 98, 182, 186, 300; 379/420.01, 379/431, 428.01, 430, 440
See application file for complete search history.

(56) References Cited

U.S. PATENT DOCUMENTS

| | | | |
|---|---|---|---|
| 4,790,407 A | | 12/1988 | Yamamoto et al. |
| 5,109,424 A | * | 4/1992 | Andre et al. ............ 381/384 |
| 5,469,508 A | | 11/1995 | Vallier |
| 5,729,605 A | | 3/1998 | Bobisuthi |
| 5,809,156 A | * | 9/1998 | Bartels et al. .......... 381/370 |
| 5,974,157 A | | 10/1999 | Tajima |
| 6,356,644 B1 | * | 3/2002 | Pollak ................... 381/371 |

FOREIGN PATENT DOCUMENTS

| | | |
|---|---|---|
| DE | 4019645 A1 | 6/1990 |
| DE | 42 23 572 C1 | 1/1994 |
| EP | 03 25 5913 | 3/2004 |
| GB | 2373408 A | 8/2002 |
| GB | 0222067.1 | 2/2003 |
| JP | 04 072899 | 3/1992 |

* cited by examiner

*Primary Examiner*—Huyen Le
(74) *Attorney, Agent, or Firm*—Marger Johnson & McCollom P.C.

(57) ABSTRACT

An embedded loudspeaker system is set forth incorporating at least two asymmetric enclosures having different but overlapping frequency responses in order to achieve a substantially flat frequency response. At least one of the speaker enclosures is preferably ported (bass-reflex system) to provide as much output as possible in the low-frequency range. By using a plurality of speakers at least one of which has a bass reflex enclosure, a monophonic system is provided with a flat frequency response. The dimensions of the speaker enclosures are chosen such that the anti-resonance of one loudspeaker enclosure is compensated for by the resonance of another speaker enclosure, without making use of damping, so that no "notch" appears in the frequency response of the combined system at the listening position.

5 Claims, 6 Drawing Sheets

ASYMMETRICAL LOUDSPEAKER ENCLOSURES WITH ENHANCED LOW FREQUENCY RESPONSE

FIELD OF THE INVENTION

The present invention relates generally to loudspeaker enclosures, and more specifically to a speaker system having two loudspeaker enclosures to achieve enhanced low frequency response.

BACKGROUND OF THE INVENTION

In a telephone set, cost considerations dictate the quality and size of speakers used. Typical 50 mm to 66 mm diameter telephone speakers have a first resonance frequency from about 220 to 350 Hz whereas smaller speakers can have a first resonant frequency close to 500 Hz. When the speakers are enclosed in a sealed box, these frequencies shift up consistently, such that it can be difficult to meet specifications for wide band telephony hands free operation (150 Hz-7 kHz).

The conventional method for increasing low frequency response is to use a bass-reflex design. Small speaker enclosures give rise to the problem of vortex noise for which a number of solutions have been proposed, such as those disclosed by Van Schyndel in U.S. Pat. No. 5,757,946, Roozen in U.S. Pat. No. 6,275,597, and Polk in U.S. Pat. No. 5,809,154. These solutions all teach the use of a single enclosure to achieve a desired frequency response.

Stereo loudspeaker enclosures of various types are omnipresent in audio-visual products either as separate components (e.g. sound systems, personal computers) or embedded within products (e.g. televisions, computer monitors, etc.) In all such cases the two enclosures (left and right) are of identical acoustical response and usually of the same size and shape. In some cases, stereo speakers have the low frequency augmented by the use of a third loudspeaker (sub-woofer) to cover the very low frequency range where humans have difficulty localising the source.

Sound reinforcement systems represents another application in which multiple enclosures are used. Specifically, different enclosures of different dimensions may be used for different frequency ranges (e.g. a two-way system comprising a high frequency cabinet and a low frequency cabinet). In such systems the various cabinets are usually clustered together.

In all of the foregoing systems it is desirable that speaker coverage of a specific frequency band be accomplished with as flat a frequency response as possible. Where multiple drivers or enclosures are used, the overlap in frequency response is minimised and is designed so that the transition from one range to another is as smooth as possible.

SUMMARY OF THE INVENTION

According to the present invention an embedded loudspeaker system is set forth incorporating at least two asymmetric enclosures (i.e. different sizes) having different but overlapping frequency responses in order to achieve a substantially flat frequency response at the listener position.

At least one of the speaker enclosures is preferably ported (bass-reflex system) to provide as much output as possible in the low-frequency range. By using a plurality of speakers at least one of which has a bass reflex enclosure, a monophonic system is provided with a flat frequency response. The dimensions of the speaker enclosures are chosen such that the anti-resonance of one loudspeaker enclosure is compensated for by the resonance of another speaker enclosure, without making use of damping, so that no "notch" appears in the frequency response of the combined system at the listening position.

BRIEF DESCRIPTION OF THE DRAWINGS

A detailed description of the preferred embodiment is set forth herein below having regards to the following drawings, in which:

FIG. 3. comprising

DETAILED DESCRIPTION OF THE PREFERRED EMBODIMENT

Figure 1:
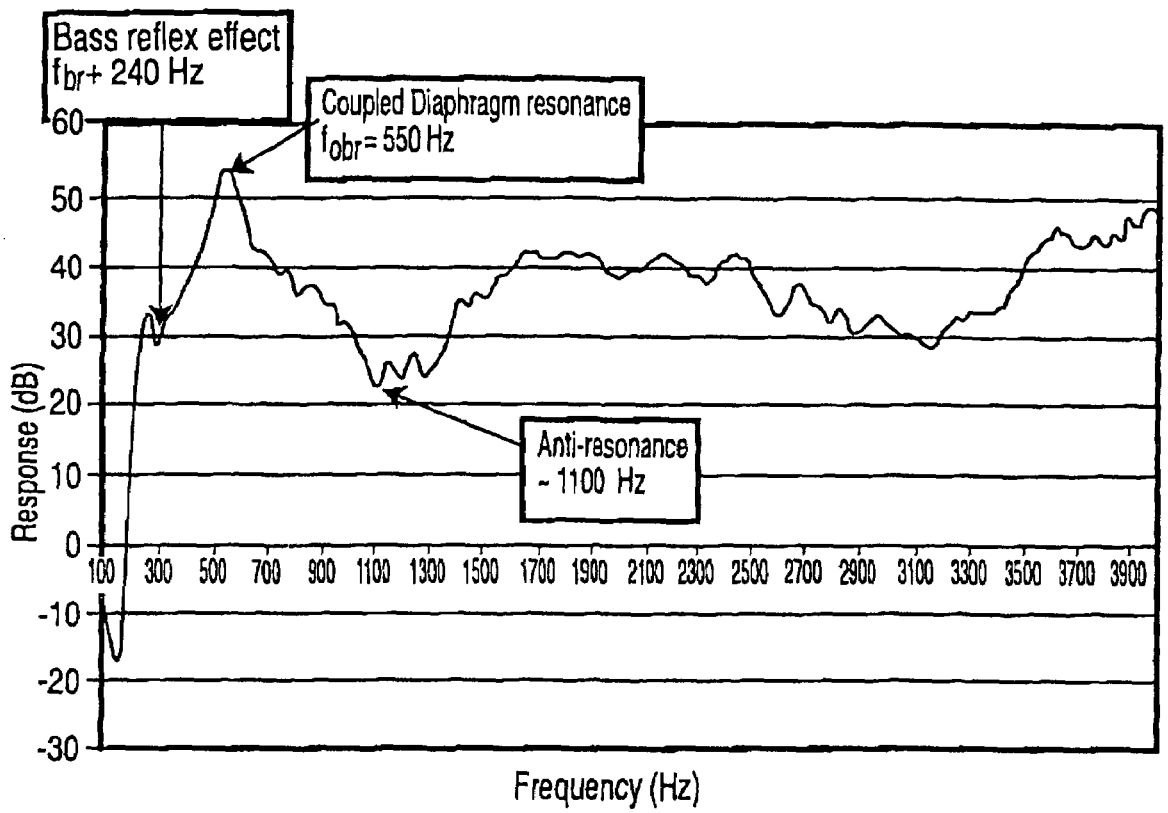
FIG. 1 is the frequency response of a single speaker on the left corner of a typical telephone set.
Figure 2:
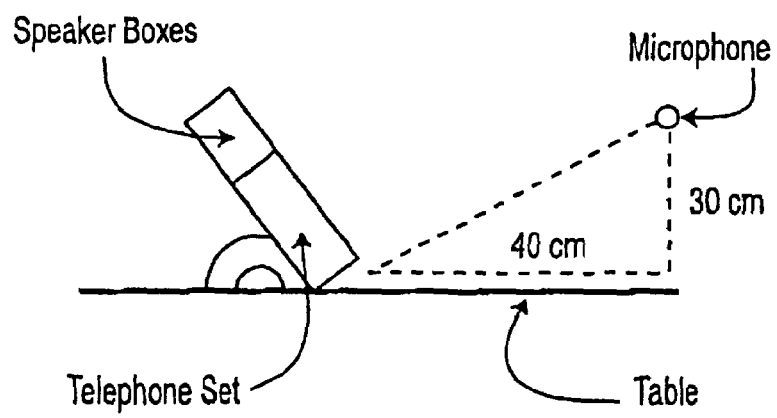
FIG. 2 shows the telephone set measurement that gives rise to the response of FIG. 1.

FIG. 1 shows the frequency response of a small speaker having a first resonance frequency in free field of about 410 Hz, mounted in an optimised ported box at the left corner of a telephone set, according to the test set-up of FIG. 2. Specifically, the response is measured in an anechoic chamber in accordance to ITU-T p.340 at the ERP (Ear Reference Point, 50 cm from the center of the set)

It will be noted from FIG. 1 that two resonance peaks appear in the low frequency end, resulting from the port/box resonance (coupled with the speaker diaphragm) and the speaker diaphragm resonance (coupled with the open box), respectively. Two identical (i.e. symmetric) speakers would result in the same frequency response increased by 6 dB.

Figure 3A:
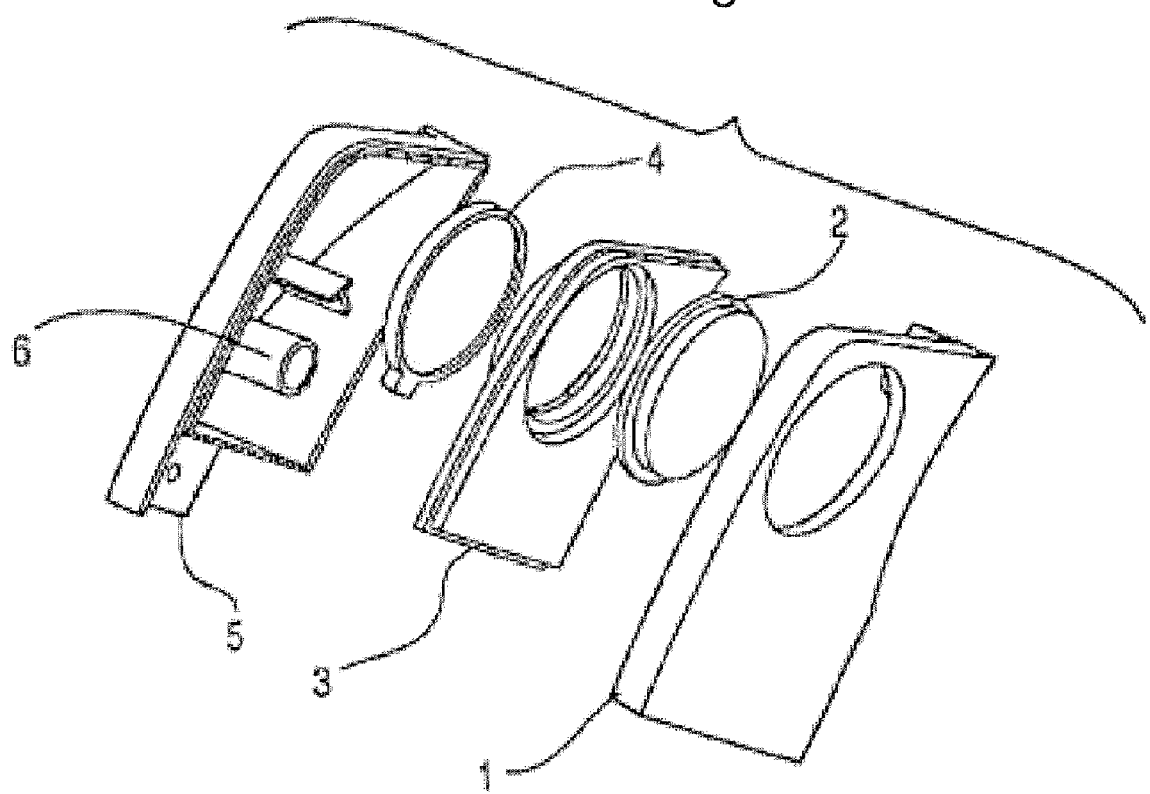
FIGS. 3A and 3B, is an exploded view of the assembly of the speaker enclosure for the telephone set of FIG. 2.

FIG. 3A illustrates the construction of a ported loudspeaker enclosure such as incorporated into the telephone set of FIG. 2. A front cover [1] is provided with an opening to accommodate a separate acoustically transparent decorative grill [2]. A loudspeaker enclosure gasket [3] secures the grill in place, supports the loudspeaker [4], and ensures an airtight seal. The loudspeaker used is a small substantially flat device. Finally, a rear cover [5] of the set provides the mechanical force necessary to maintain an airtight seal about the loudspeaker enclosure and defines the enclosure volume. A base-reflex port [6] is moulded as an integral part of the rear cover.

As shown in FIG. 1, the bass-reflex system is tuned at $f_{br}$=240 Hz and the first diaphragm resonance, coupled with the ported enclosure, is about $f_{obr}$=550 Hz (up from $f_0$=410 Hz in free field). If the system is too demanding for the diaphragm efficiency (i.e. if $f_{br}$ is chosen too low compared to the initial $f_0$) the diaphragm may be incapable of providing enough vibration energy at $f_{br}$ to compress the box air volume and drive the port resonance. This also results in a strong anti-resonance, appealing in the frequency response of FIG. 1 close to 1100 Hz.

Figure 3B:
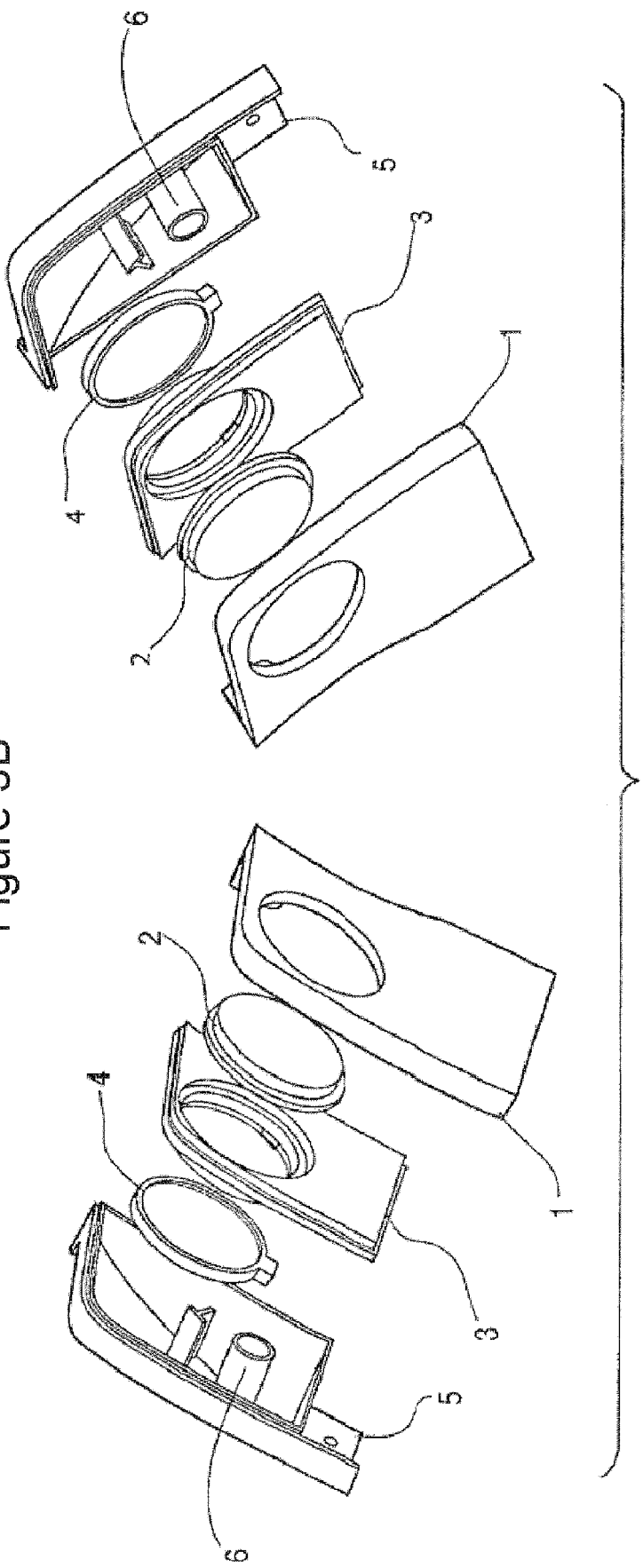
Figure 4:
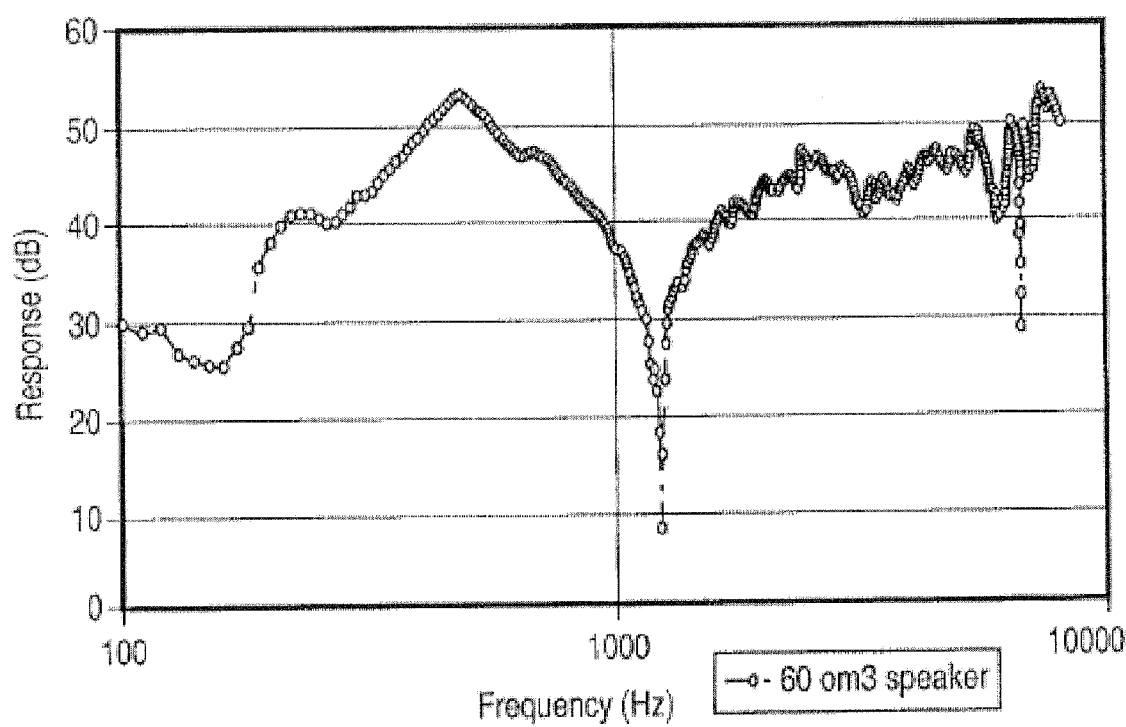
FIG. 4 is the frequency response of a 60 cc speaker enclosure in accordance with the preferred embodiment.
Figure 5:
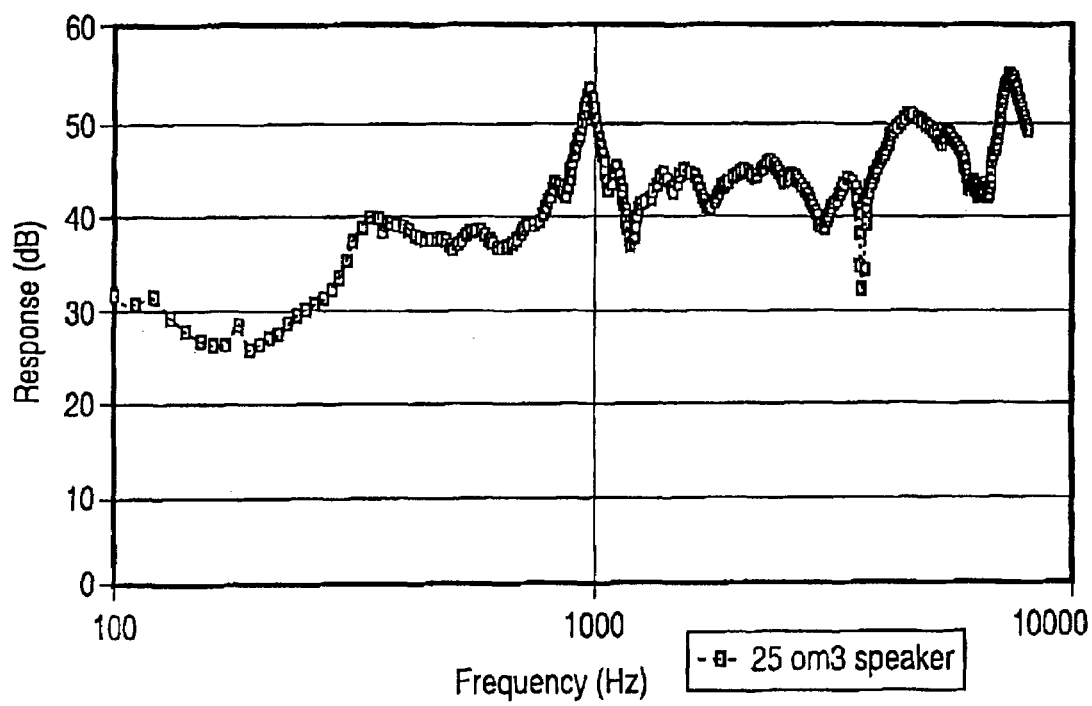
FIG. 5 is the frequency response of a 25 cc speaker enclosure in accordance with the preferred embodiment.
Figure 6:
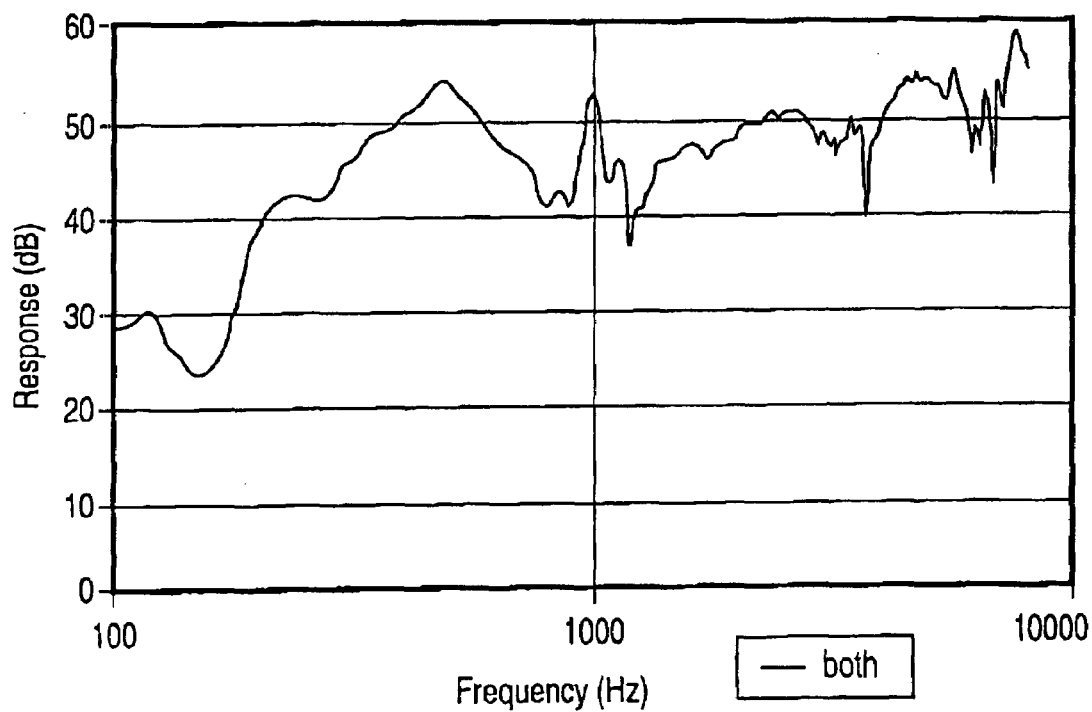
FIG. 6 is the frequency response for a combination of both the 60 cc speaker and 25 cc speaker in accordance with the preferred embodiment.

According to the present invention, in order to prevent strong amplitude variations two loudspeaker enclosures with different volumes and characteristics are used, as shown in FIG. 3B, rather than two identical speakers. This allows for a different tuning of the left and right speakers as shown in FIGS. 4 and 5. The first (left) enclosure has a volume of 60 cc with substantially the same characteristics mentioned previously and its response is shown in FIG. 4. The second (right) enclosure has a volume of 25 cc and is tuned so that its coupled loudspeaker diaphragm first resonance frequency is close to the first anti-resonance of the first loudspeaker enclosure. The smaller enclosure response is shown in FIG. 5. FIG. 6 shows the response of the system with both enclosures when measured according to ITU-T P.340 standard (i.e. the set-up is illustrated in FIG. 2).

Figure 7:
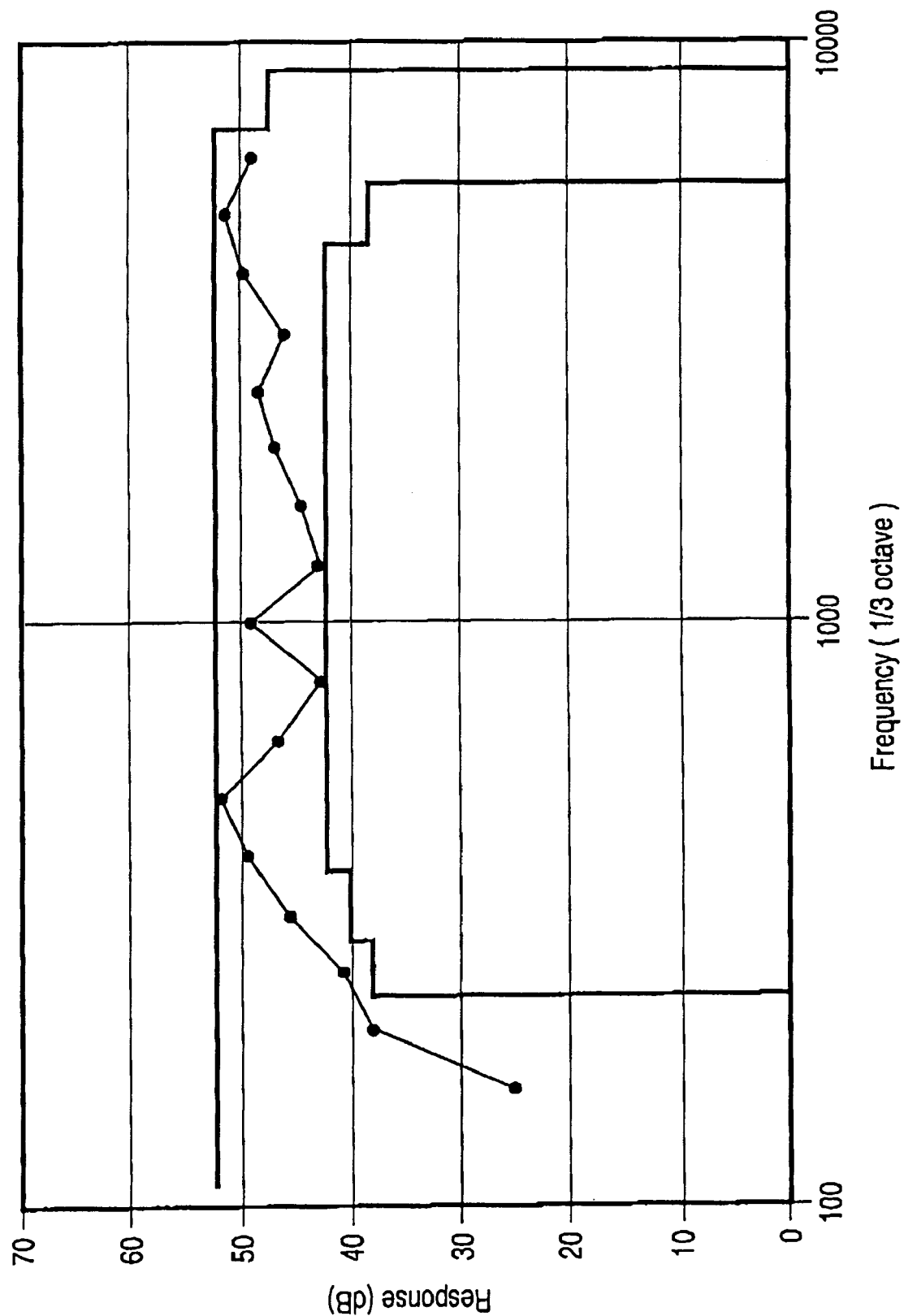
FIG. 7 is the frequency response of FIG. 6 shown in $\frac{1}{3}^{rd}$ octave bands fitting within proposed TIA wide band requirements.

The combination of asymmetric speaker enclosures enhances the low frequency end of the response curve, generates two diaphragm resonance peaks and prevents the strong anti-resonance amplitude drop evident from FIG. 1. Compared with one or two identical ported speakers, the system of this invention improves amplitude variations at low and medium frequencies. Additionally, the speaker system of the present invention meets the TIA/EIA PN-4705 Draft 7 (expected to be published as TIA-920-200X) wide band audio hands free receive frequency response requirement ($1/3^{rd}$ octave bands), as shown in FIG. 7.

Modifications and alternatives of the invention are possible. As can be appreciated, the stereo experience with the asymmetrical system of the present invention is somewhat unusual. In order to provide adequate stereo imaging, signal processing may be used to present the low frequencies to both loudspeakers while separating only the high frequencies. Since humans have fairly poor localisation in lower frequencies the proposed signal processing provides a reasonable quality stereo image. In telephony applications where the primary audio source is monophonic voice with the occasional requirement for stereophonic material (e.g. music on hold) this is an acceptable compromise where space and expense are limited. All such modifications and variations are believed to be within the sphere and scope of the invention as defined by the claims appended hereto.

We claim:

1. A speaker system disposed within a telephone set, comprising:
    a first of a pair of left and right loudspeakers coupled with a first enclosure configured to have a first frequency response at an ear reference point, that includes an anti-resonance; and
    a second of said pair of left and right loudspeakers coupled with a corresponding further enclosure that is smaller than said first loudspeaker enclosure and is configured to have a further frequency response at said ear reference point, including a resonance that overlaps and compensates for said anti-resonance, such that said first and further loudspeakers provide a substantially flat combined frequency response.

2. The speaker system of claim 1, wherein at least one of said first and further loudspeaker enclosures is ported to provide enhanced low frequency response.

3. The speaker system of claim 1, wherein each of said first and further loudspeaker enclosures comprises a front cover with an opening, an acoustically transparent grill mounted in said opening, a gasket for securing said grill in place and supporting said respective first and second of said pair of loudspeakers, and a rear cover, so that said first and further loudspeaker enclosures are airtight and defined with respective predetermined volumes.

4. The speaker system of claim 3, wherein said rear cover includes a bass-reflex port.

5. The speaker system of claim 4, wherein the predetermined volume of said first loudspeaker enclosure is 60 cc and the predetermined volume of said further loudspeaker enclosure is 25 cc.

* * * * *